United States Patent [19]
DeLuca

[11] 3,933,454
[45] Jan. 20, 1976

[54] METHOD OF MAKING OPTICAL WAVEGUIDES

[75] Inventor: Robert D. DeLuca, Big Flats, N.Y.

[73] Assignee: Corning Glass Works, Corning, N.Y.

[22] Filed: Apr. 22, 1974

[21] Appl. No.: 462,962

[52] U.S. Cl. .............................. 65/3; 65/18; 65/30; 65/DIG. 7; 427/167
[51] Int. Cl.² .................. C03C 25/02; C03C 21/00; C03C 17/22
[58] Field of Search ...... 65/3, 4, 18, 13, 30, DIG. 7; 427/165, 167

[56] References Cited
UNITED STATES PATENTS

| | | | |
|---|---|---|---|
| 2,326,059 | 8/1943 | Nordberg | 65/18 X |
| 2,904,713 | 9/1959 | Heraeus et al. | 65/18 X |
| 3,850,602 | 11/1974 | Brüning | 65/30 X |

*Primary Examiner*—Robert L. Lindsay, Jr.
*Attorney, Agent, or Firm*—Walter S. Zebrowski; Clarence R. Patty, Jr.

[57] ABSTRACT

A method of making low loss glass optical waveguides, wherein at least one coating of glass soot is deposited by the flame hydrolysis process on a starting member. The soot coating is heated to its consolidation temperature in an atmosphere containing helium and an amount of chlorine that is effective to substantially remove the water from the glass soot while the soot is being consolidated to form a dense glass layer. The starting member is removed unless it is to form a part of the optical waveguide. The resultant structure, including the dense glass body, is then drawn into a waveguide fiber.

18 Claims, 5 Drawing Figures

METHOD OF MAKING OPTICAL WAVEGUIDES

BACKGROUND OF THE INVENTION

1. Field of the Invention

This invention relates to a method of forming, by the flame hydrolysis technique, high optical purity blanks from which high quality optical waveguides, lenses, prisms and the like can be made. This invention is particularly applicable to optical waveguides which must be formed from extremely pure materials.

High capacity communication systems operating around $10^{15}$ Hz are needed to accommodate future increases in communication traffic. These systems are referred to as optical communication systems since $10^{15}$ Hz is within the frequency spectrum of light. Optical waveguides, which are the most promising medium for transmission at such frequencies, normally consist of an optical fiber having a transparent core surrounded by transparent cladding material having a refractive index lower than that of the core.

The stringent optical requirements placed on the transmission medium to be employed in optical communication systems has negated the use of conventional glass fiber optics, since attenuation therein due to both scattering and impurity absorption is much too high. Thus, unique methods had to be developed for preparing very high purity glasses in fiber optic form. Glass preparation techniques which have shown much promise are based on the flame hydrolysis process which employs vapor phase reaction of high purity vapors. This approach to the formation of low loss optical waveguides is based on methods described in U.S. Pat. Nos. 2,272,342 and 2,326,059 issued to J. F. Hyde and M. E. Nordberg, respectively. The flame hydrolysis technique has been employed to prepare single mode waveguides and multimode waveguides of both the step-index and graded-index type. Various methods employing the flame hydrolysis technique for forming glass optical waveguide fibers are taught in U.S. Pat. Nos. 3,711,262; 3,737,292 and 3,737,293. A method employing the flame hydrolysis technique to form a graded-index type waveguide is taught in U.S. patent application Ser. No. 239,496 filed Mar. 30, 1972, entitled "Method of Forming a Light Focusing Fiber Waveguide" now U.S. Pat. No. 3,826,560.

The usefulness of glass optical waveguides in optical transmission systems depends upon the attainment of very low loss transmission over the entire wavelength range of about 700–1100 nm. This can be achieved by reducing attenuation due to optical scattering and absorption to a level which approaches the minimum theoretically attainable level. Waveguides in which at least 80% of the scattering loss can be accounted for by intrinsic glass scattering have been made by the aforementioned flame hydrolysis technique. However, due to the presence of residual water produced by this technique, absorption losses between 700 nm and 1100 nm have been excessively large. By residual water in glass is meant that the glass contains a high level of OH, $H_2$ and $H_2O$. One explanation of residual water may be found in U.S. Pat. No. 3,531,271 to W. H. Dumbaugh, Jr. The maximum attenuation in the aforementioned wavelength range that is attributable to residual water occurs at about 950 nm and is related to the OH content by the coefficient 1.25 dB/km/ppm OH. The remaining portion of the attenuation at 950 nm, which is due to factors such as intrinsic material scattering, amounts to about 4 dB/km. For example, a glass optical waveguide having an attenuation less than 6 dB/km at 800 nm may have an attenuation greater than 100 dB/km at 950 nm due to the presence of water therein. To be useful in optical communication systems, optical waveguide attenuation is preferably less than 10 dB/km at the wavelength of light being propagated therein. In order to achieve such low attenuation over the entire range between 700 nm and 1100 nm, a glass waveguide fiber must be rendered substantially water-free, i.e., the amount of residual water within the fiber must be reduced to a level of less than 10 ppm.

Since residual water causes a strong absorption at about 2.73 μm, but light transmission at about 2.1 μm is relatively unaffected by water, residual water content in a glass waveguide may be specified in terms of an absorption coefficient referred to as the "beta value" and designated $\beta_{OH}$, which is calculated from the formula:

$$\beta_{OH} = \frac{1}{t} \log_{10} \frac{T_{2.1}}{T_{2.73}}$$

wherein $t$ is the glass thickness in mm, $T_{2.1}$ and $T_{2.73}$ are the transmittances in percent at 2.1 μm and 2.73 μm, respectively, $\beta_{OH}$ being in terms of $mm^{-1}$. To produce waveguides having an attenuation less than 20 dB/km over the range 700–1100 nm, it has been found that the waveguide glass must have a $\beta_{OH}$ of less than 0.001.

2. Description of the Prior Art

Since it is impossible to reduce the water content to acceptable levels after flame hydrolysis-produced soot has been consolidated to form a solid glass coating, the water must be removed before or during the consolidation process. Heretofore, various methods were employed to reduce the water content in optical waveguides produced by flame hydrolysis. Such disadvantages as long processing times, equipment problems and incomplete water removal were encountered.

One prior art method of producing low water content fused silica included the steps of forming by flame hydrolysis a $SiO_2$ soot preform and then placing the preform in a preheated furnace at approximately 1500°C. for approximately 30 minutes. The furnace contained a reducing atmosphere of cracked ammonia or forming gas. During the heat treatment, the soot was sintered and consolidated into a dense glass body which was to a certain extent water-free ($\beta_{OH}$ approximately equal to 0.02), but the amount of water remaining in the resultant glass was excessive in terms of tolerable amounts for optical communication systems.

A $\beta_{OH}$ value of about 0.01 was achieved by consolidating a soot preform in an inert dry atmosphere such as nitrogen, helium, neon or argon. In accordance with this method, which is disclosed in copending patent application Ser. No. 239,742 filed Mar. 30, 1972, the inert gas replaces trapped air in the preform and subsequently dissolves in the glass. Since this method includes gradient sintering, gases can escape through unconsolidated parts of the preform. Optical waveguides made by the process exhibited attenuations as low as 30 dB/km at 950 nm, a value that is not sufficiently low for the propagation of optical signals.

In my copending patent application Ser. No. 239,746 filed Mar. 30, 1972, there is disclosed a method of forming a glass optical waveguide containing less than 20 ppm residual water. In accordance with the method of that application the flame hydrolysis-produced soot preform is placed in a chamber which is evacuated to less than $10^{-5}$ Torr. The chamber is heated below the sintering temperature of the soot to permit entrapped gas to escape from the preform and the temperature is maintained until an equilibrium is reached between the partial pressure of the entrapped gas in the porous preform and the partial pressure of the same gas in the furnace environment. A period of about 24 hours is required for equilibrium to be reached, at which time the porous preform is further heated to consolidate the soot particles and to form a dense glass member. An optical waveguide formed in accordance with this method exhibited an attenuation of less than 20 dB/km. Although relatively low loss optical waveguides can be produced, this process is disadvantageous in that it requires an extremely long time for water removal, and it may result in the volatilization of some dopant oxides. Also, equipment problems have been encountered because of the need to maintain very low pressures for long periods of time. Moreover, the preform cannot be consolidated until after the water removal step is completed.

Various methods have been heretofore employed to make low water content glasses by methods other than the flame hydrolysis technique. None of these methods have been found to satisfactorily remove water from a flame hydrolysis-produced soot preform which is to be used in the manufacture of optical waveguides. For example, the aforementioned patent to W. H. Dumbaugh, Jr. teaches a method of making a low water content glass body by mixing the batch ingredients together with an effective amount of a chemically-reactive, chlorine containing agent and melting the glass in the presence of a dry atmosphere flowing directly over the glass melt. Obviously, this method cannot be adapted to the flame hydrolysis process wherein the glass article is not formed by melting batch ingredients. Moreover, it is noted that even though chlorine containing compounds such as $SiCl_4$ are employed in the flame hydrolysis process to form silica containing soot preforms, the chlorine present does not result in the formation of water-free soot.

Another prior art method for removing water from glass bodies produced by a technique other than flame hydrolysis is disclosed in U.S. Pat. No. 3,459,522 issued to T. H. Elmer et al. This patent describes a method of removing residual water from a porous, high silica content glass body by subjecting it to a flowing stream of a substantially dry atmosphere containing 10% or more of either chlorine gas or a chlorine vapor at a temperature of 600°–1000°C. The treated porous glass body is thereafter consolidated in a dry, nonoxidizing atmosphere to produce a nonporous, transparent glass article. The porous glass body disclosed in the Elmer et al. patent is well known under the commercial designation "96% silica glass", which is produced by consolidating a porous glass body characterized by a multiplicity of intercommunicating, submicroscopic pores throughout its mass. The basic production steps involved in the formation of such a porous body, which are described in U.S. Pat. No. 2,221,709 issued to H. P. Hood et al., include the steps of forming an article from a borosilicate glass, thermally treating the article at a temperature of 500°–600°C. to separate the glass into a silica-rich phase and a silica-poor phase, leeching the silica-poor phase to produce a porous structure composed of the silica-rich phase, removing the leeching residue, and thermally consolidating the porous structure into a nonporous vitreous article.

Because of the kind of microstructure present in the porous glass body disclosed in the Elmer patent and due to the fact that the chlorination process disclosed therein is carried out at a temperature below the consolidation temperature, an atmosphere containing a relatively large concentration of chlorine must be employed. That patent therefore requires a chlorine containing atmosphere having 10% or more of either chlorine gas or a chlorine vapor, and most of the examples disclosed therein employ chlorine gas with no diluent. The Elmer patent further teaches that after chlorine treatment, it is undesirable to maintain the porous glass in a chlorine containing atmosphere while the temperature is increased to the consolidation temperature because of economic considerations and because this may result in retention of an excess amount of chlorine within the glass and may cause splitting of the glass. Therefore, the chlorine treated porous glass is removed from the chlorine atmosphere and transferred in an inert atmosphere such as nitrogen for further heat treatment, consolidation being preferably performed in an inert atmosphere or vacuum at a temperature between 1200°C. and 1300°C.

For at least the following reasons the method of the Elmer et al. patent is unsatisfactory for removing water from flame hydrolysis-produced glass soot preforms from which optical waveguides are made. The high chlorine content of the chlorine containing atmosphere employed by the Elmer et al. patent can cause reboil in subsequent heat treatment of the preform and can also introduce an unacceptable level of contamination in the glass due to the presence of contaminants in commercial grade chlorine sources. Transferring the soot preform from the chlorination chamber to the consolidation chamber can permit water to reenter the porous soot blank. Whereas the Elmer patent teaches separate chlorination and consolidation steps, it is more economical and efficient to remove water from the glass soot concurrently with the consolidation of such soot. Moreover, the rate of removal of water by chlorine is temperature related, it being slower at temperatures between 600°C. and 1000°C. than at the soot consolidation temperature which is between about 1250°C. and 1700°C. for silica.

SUMMARY OF THE INVENTION

It is therefore an object of the present invention to provide an effective and economical method of removing residual water from a flame hydrolysis-deposited glass soot preform during the consolidation process. A further object is to provide a method of forming water-free optical waveguides having extremely low concentrations of contaminants.

Briefly, the present invention relates to an improved method of forming a glass article by the flame hydrolysis-process. This process conventionally comprises the steps of depositing on a starting member a coating of flame hydrolysis-produced glass soot to form a soot preform, consolidating the soot preform to form a dense glass layer, and forming the dense glass layer into a desired shape. The consolidation step conventionally comprises subjecting the soot preform to a temperature in the consolidation temperature range, for a time sufficient to permit the soot particles to fuse and consolidate, thereby forming a dense glass layer which is free from particle boundaries. In connection with the fusing of glass soot particles formed by flame hydrolysis, this process is sometimes referred to as sintering even though no particle boundaries remain.

In accordance with the present invention, the step of consolidating is characterized in that it comprises heating the soot preform to a temperature within the consolidation temperature range for a time sufficient to cause the soot particles to fuse and form a dense glass layer, and simultaneously subjecting the soot preform to a stream of a substantially dry chlorine containing atmosphere. The chlorine permeates the interstices of the soot preform during the consolidation thereof and replaces hydroxyl ions by chlorine ions, thereby resulting in a glass article that is substantially water-free.

The method of the present invention is particularly applicable to the formation of any type of glass optical waveguide produced by flame hydrolysis. This method involves the deposition of the desired number of soot coatings on a starting member which may form a part of the resultant waveguide structure or which may be removed during the waveguide fabrication process. The starting member may be in the form of a solid cylindrical rod, a hollow cylinder, a flat substrate or the like. After the soot preform is consolidated in accordance with the improved method set forth hereinabove, the starting member is generally removed, and the consolidated preform may be drawn into a fiber. Optical waveguides formed by the method of the present invention have exhibited an attenuation less than 10 dB/km between 650 and 1100 nm.

DETAILED DESCRIPTION OF THE INVENTION

It is to be noted that the drawings are illustrated and symbolic of the present invention and there is no intention to indicate the scale or relative proportions of the elements shown therein. For the purposes of simplicity, the present invention will be substantially described in connection with the formation of a low loss optical waveguide although this invention is not intended to be limited thereto.

Figure 1:
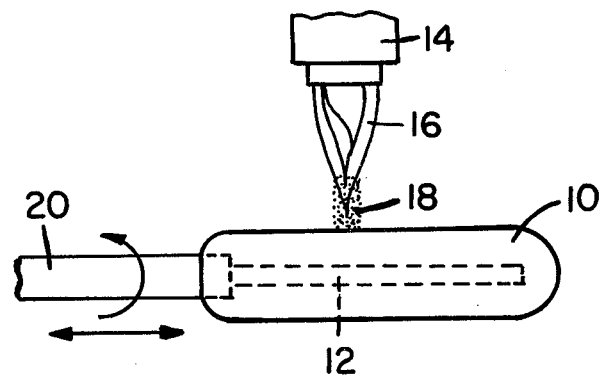
FIGS. 1 and 2 illustrate the application of first and second coatings of glass soot to a starting member.

Referring to FIG. 1, a coating 10 of glass soot is applied to a substantially cylindrical starting member or rod 12 by means of flame hydrolysis burner 14. Fuel gas and oxygen or air are supplied to burner 14 from a source not shown. This mixture is burned to produce flame 16 which is emitted from the burner. The vapor of a hydrolyzable compound is introduced into flame 16, and the gas-vapor mixture is hydrolyzed within the flame to form a glass soot that leaves flame 16 in a stream 18 which is directed toward starting member 12. The flame hydrolysis method of forming a coating of glass soot is described in greater detail in the aforementioned U.S. Pat. Nos. 3,711,262; 3,737,292 and 3,737,293, in the aforementioned application Ser. No. 239,496 and in U.S. patent application Ser. No. 239,701 filed Mar. 30, 1972, entitled "Planar Optical waveguide". Starting member 12 is supported by means of support portion 20 and is rotated and translated as indicated by the arrows adjacent thereto in FIG. 1 for uniform deposition of the soot. It is to be understood that an elongated ribbon burner, not shown, that provides a long stream of soot could be used in place of the substantially concentric burner illustrated in FIG. 1 whereby starting member 12 would only have to be rotated. Further, a plurality of burners 14 could be employed in a row to similarly require only rotation.

Figure 2:
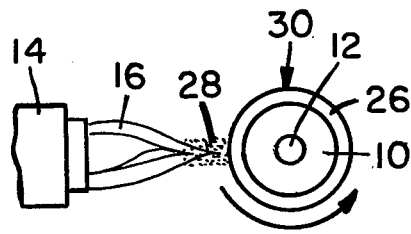

To form step-index optical waveguide, a second coating 26 of glass soot may be applied over the outside peripheral surface of first coating 10 as shown in FIG. 2. In accordance with well known practive the refractive index of coating 26 is made lower than that of coating 10 by changing the composition of the soot being produced in flame 16. This can be accomplished by changing the concentration or type of dopant material being introduced into the flame, or by omitting the dopant material. Support member 20 is again rotated and translated to provide a uniform deposition of coating 26, the composite structure including first coating 10 and second coating 26 constituting an optical waveguide preform 30.

Since glass starting member 12 is ultimately removed, the material of member 12 need only be such as to have a composition and coefficient of expansion compatible with the material of layer 10. A suitable material may be a normally produced glass having a composition similar to that of the layer 10 material although it does not need the high purity thereof. It may be normally produced glass having ordinary or even an excessive level of impurity or entrapped gas that would otherwise render it unsuitable for effective light propagation. The starting member may also be formed of graphite or the like.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide and germanium oxide. Optical waveguides can also be made by forming the core from one or more of the aforementioned dopant oxides, the cladding being made from one or more materials having a lower refractive index. For example, a core made of pure germanium oxide may be surrounded by a cladding layer of fused silica and germanium oxide.

The flame hydrolysis technique results in the formation of glasses having extremely low losses due to scattering and impurity absorption. Optical waveguides made by this technique have exhibited total losses as low as 2 dB/km at 1,060 nm. However, even when optical waveguides are formed of glasses having such high optical quality, light attenuation at certain regions of the wavelength spectrum may be so great as to preclude the use of such waveguides for the propagation of light in those regions. For example, an optical waveguide having a core of 90% $SiO_2$ and 10% $GeO_2$ and a cladding of pure $SiO_2$ was made by the flame therefrom. process, no attempt being made to remove water therfrom. It was found that water was responsible for such an excessive attenuation in the 700–1100 nm region that the waveguide was useless for the propagation of optical signals at most wavelengths within that region. At 950 nm the attenuation was over 100 dB/km. Various oxides from which such glass optical waveguides are formed, especially $SiO_2$, have a great affinity for water. However, after such glass waveguides are completely formed, the inner, light propagating portion thereof is inaccessible to water. The tendency of these glasses to absorb water is not detrimental to water-free glass optical waveguides after they are formed since most of the light energy is propagated in and around the core, and the presence of water on the outer surface has a negligable effect on the propagation of such energy. However, in the formation of optical waveguides by flame hydrolysis, residual water, which is produced by the flame, appears throughout those portions of the waveguide that have been produced by flame hydrolysis. Also, water is readily adsorbed by the soot during handling in air prior to the consolidation process because of the extremely high porosity thereof.

In accordance with the present invention the soot preform deposited by flame hydrolysis is consolidated in a continuously flowing atmosphere comprising helium and an effective amount up to about 5 vol. percent chlorine to form a dense glass body having a reduced water content. Even a very small percentage of chlorine in the consolidation furnace will react with water in the soot, thereby lowering the concentration of water in the resultant device; however, an appreciable reduction in water content begins to occur when the consolidation atmosphere contains about 0.5 vol. percent chlorine. Helium is employed as the diluent gas since it can readily pass through the interstices of the porous soot preform and purge residual gas therefrom. Hydrogen cannot be used as the diluent gas since it tends to increase the water content of the glass. Gases heavier than helium are not sufficiently effective in purging residual gas from the soot. Whereas the attenuation due to residual water is greatly decreased by the present chlorine treatment, the attenuation at all wavelengths between 700 and 1100 nm increases slightly. Therefore, the amount of chlorine present in the consolidation atmosphere should be no more than that required to render the soot substantially water-free. Any amount of chlorine in addition to the required amount may increase attenuation with no accompanying beneficial result. It is thought that the slight increase in attenuation throughout the useable wavelength spectrum, which results from this chlorine treatment, is due to impurities which are present in the chlorine gas source. It is noted that the percentage of chlorine required in the consolidation atmosphere of the present invention is relatively low as compared to prior chlorinating atmospheres since chlorine is extremely reactive at soot consolidation temperatures.

The consolidation temperature depends upon the composition of the glass soot and is in the range of 1250°–1700°C. for high silica content soot. It is also time dependent, consolidation at 1250°C. requiring a very long time. The preferred consolidation temperature for high silica content soot is between 1400°C. and 1500°C. Other glasses can be consolidated at lower temperatures, pure germania, for example, consolidating at about 900°C.

Chlorine may be supplied to the consolidation furnace as chlorine gas or as a chlorine containing compound that is gaseous or that can be supplied to the consolidation furnace in vapor form. Any volatile chlorine containing compound can be employed that does not adversely affect the glass by significantly increasing the light absorption thereof or degrading such physical properties as ease of fiber formation. Such chlorides as $SiCl_4$, $BCl_3$ and $CCl_4$ are examples of suitable chlorine containing compounds. Other suitable compounds are set forth in the aforementioned U.S. Pat. No. 3,459,522. Vapors of these compounds can be transported to the consolidation furnace by bubbling a gas such as helium or oxygen therethrough. The chlorine containing vapors are very unstable and therefore break down in the furnace to release chlorine gas which functions as described hereinabove to remove water from the glass soot during consolidation thereof. The amount of chlorine that will be released by such a compound can be varied by controlling the temperature of the compound source and the rate of carrier gas flow therethrough.

Figure 3:
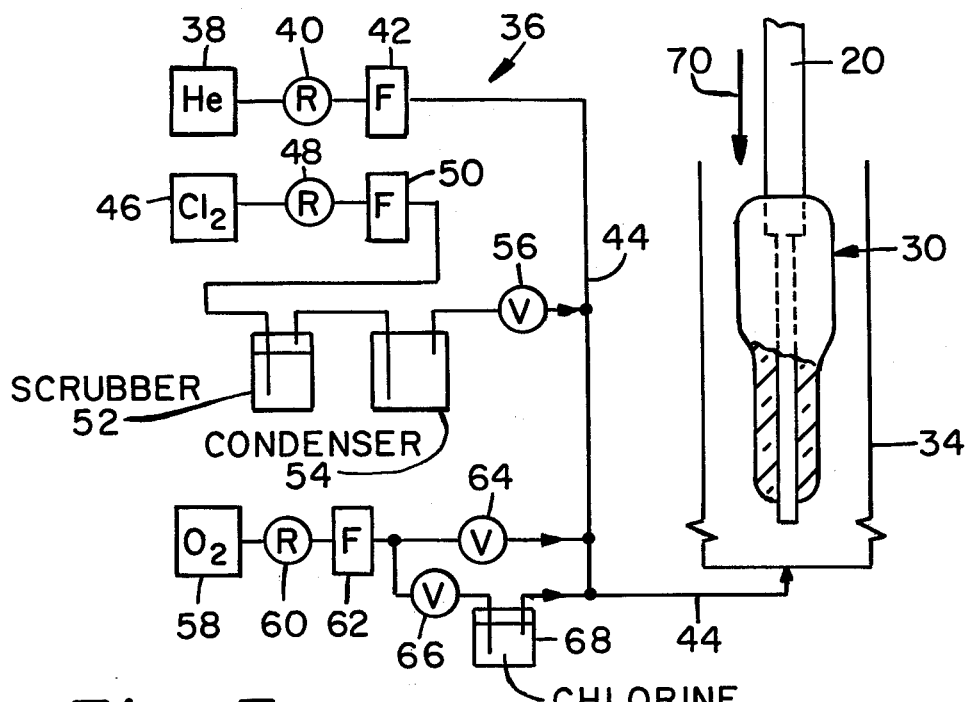
FIG. 3 is a schematic representation of a consolidation furnace and a consolidation atmosphere system.

FIG. 3 schematically illustrates the consolidation furnace 34 and the chlorination-consolidation atmosphere system 36. The vertical side walls of furnace 34 are broken to illustrate that the relative depth thereof is greater than that shown. Atmosphere system 36 is capable of providing furnace 34 with the proper mixture of helium and chlorine gases. Helium source 38 is connected by regulator 40 and flow meter 42 to an output line 44. Chlorine source 46 is connected to line 44 by regulator 48, flow meter 50, scrubber 52, condenser 54 and valve 56. Scrubber 52, which contains deionized water, was found to be useful for removing hydrolyzable impurities such as vanadium which could contaminate preform 30 during the consolidation thereof. Such impurities could result in an optical waveguide having undesirably high levels of attenuation. Condenser 54 was employed to dry the chlorine gas after it passed through scrubber 52. Valve 56 controls the percentage of chlorine present in the gas mixture flowing through line 44.

Oxygen source 58 is connected to a regulator 60 and a flowmeter 62. The output from flowmeter 62 is connected to line 44 by a first line containing a valve 64 and by a second line containing a valve 66 and a bubbler 68 in which there is disposed a chlorine containing compound. Although oxygen is not a necessary part of the consolidation atmosphere, it has been found that when it is present in small amounts it can be effective to diminish or prevent the reduction of dopant oxides present in the soot. For example, germania tends to reduce to GeO during the consolidation process, thereby causing the resultant optical waveguide to have greater absorption loss. The introduction of 0.5 vol. percent of oxygen into the consolidation atmosphere has been effective to inhibit this reduction process. This oxygen can be added to the consolidation atmosphere by closing valve 66 of FIG. 3 and adjusting valve 64 for proper flow.

The oxygen line including valve 66 can be utilized to introduce the vapor of a chlorine-containing compound into furnace 34. A mixture of helium and such vapor can be introduced into the furnace by closing valves 56 and 64 and adjusting valve 66 to provide the proper flow of oxygen into bubbler 68. The temperature of the liquid, chlorine-containing compound and the rate of oxygen flow can be adjusted to provide the proper amount of chlorine in furnace 34. If no oxygen is needed in the consolidation atmosphere, the chlorine compound vapors may be generated by bubbling helium through bubbler 68 and mixing the resultant gas-vapor mixture with additional helium to achieve the proper percentage of chlorine in the consolidation furnace atmosphere.

The inside diameter of the furnace muffle should be only slightly larger than the outside diameter of the soot preform. For example, a preform having a diameter of 1.75 inches was consolidated in a furnace, the muffle of which had a 2.75 inch inside diameter. The consolidation atmosphere flow rate depends upon the size of the preform and the size of the furnace muffle. In general, the flow rate should be such that the total volume of atmosphere within the muffle changes between about one and six times per minute, the preferred rate being about four times per minute. If the flow rate is too low, reaction products may not be completely removed prior to consolidation of the soot. If the flow rate is too great, the consolidation gases may cool the soot preform.

As indicated by arrow 70, preform 30 is inserted downwardly into furnace 34. The rate of insertion is low enough to permit the tip of the preform to consolidate first, the consolidation process then continuing up the preform until it reaches that end of the preformed adjacent to support portion 30. The temperature profile of furnace 34 is illustrated by curve 74 of FIG. 4. The maximum furnace temperature, which is preferably between 1400°C and 1500°C for high silica content soot, must be adequate to fuse the particles of glass soot and thereby consolidate the soot preform into a dense glass body in which no particle boundaries exist.

Gradient consolidation can also be accomplished by rapidly inserting a preform into a furnace having a temperature profile such that the temperature at one end of the preform is higher than that at the other. The end of the preform that is subjected to the higher temperature will consolidate first, and the consolidation process will continue toward the end which is subjected to a lower temperature. It may be advantageous to gradually increase the temperature at that end of the preform which is to be consolidated last after the first end of the preform has begun to consolidate.

Figure 4:
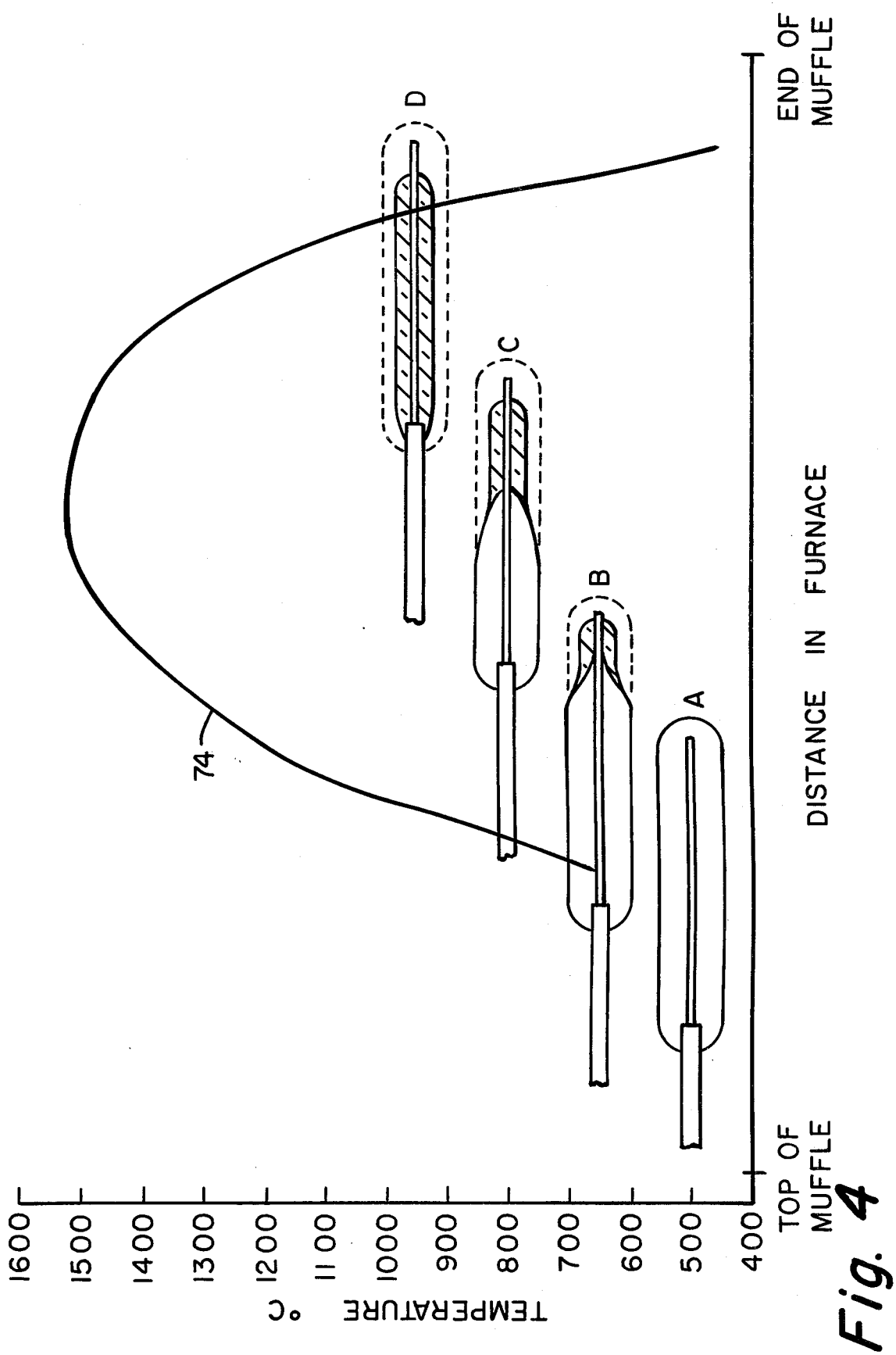
FIG. 4 is a graph illustrating the temperature profile of a typical consolidation furnace and includes step-by-step schematic illustrations of the consolidation of a soot preform.

As soot preform 30 enters furnace 34 the chlorine containing consolidation atmosphere passes through the interstices of the soot where it lowers the water content by causing hydroxyl ions to be replaced by chlorine ions. In addition, the helium purges residual gases from the interstices of the soot. As illustrated in FIG. 4, consolidation of the soot begins at the tip that is initially inserted, and it then gradually progresses to the opposite end of the preform. Four phases of the consolidation process are indicated by letters A through D. In positions B through D, wherein a part or all of the soot preform is consolidated, the original outline of the soot preform is represented by dashed lines. Due to the type of microstructure present in the soot preform, the outside thereof would sinter first if the entire preform were suddenly immersed in the high temperature region of the furnace. Gases would therefore be entrapped in the resultant dense glass body and the chlorine present in the furnace atmosphere would be unable to completely penetrate into the interstices of the soot preform to remove water therefrom. The preform is therefore initially inserted to position A of FIG. 4 where it is heated to a temperature just below the consolidation temperature. The preform is then further inserted to position B where it is held for a time that is sufficient to insure consolidation of the end portion thereof. As indicated by positions C and D, the preform is then lowered at such a rate that entrapped gases are permitted to escape and the chlorination atmosphere is permitted to penetrate and substantially remove the water therefrom. The resultant dense glass body is then slowly moved back to position A, where it receives a slight annealing treatment, and then removed from the furnace. The rate of insertion between positions B and D depends upon the size of the soot preform and the composition thereof, the preferred rate being between about 0.1 inch per minute and 1.0 inch per minute.

The method of the present invention has produced glasses having an OH content less than 1 part per million. This method is economical and time saving in that the chlorination process which removes water from the soot is accomplished simultaneously with the soot consolidation process. Since the chlorination process is performed at relatively high consolidation temperatures, relatively small percentages of chlorine can be present in the consolidation atmosphere. This method therefore does not result in the trapping of undesirable amounts of chlorine gas which could produce detrimental effects in the subsequent heat treatment of the resultant dense glass body such as drawing an optical waveguide fiber therefrom.

If both the core and cladding of the optical waveguide are to be formed by the flame hydrolysis technique, a plurality of layers of soot of different composition can be built up as described in conjunction with FIGS. 1 and 2, and thereafter, both layers can be simultaneously chlorinated and consolidated. Alternatively, the first layer of soot can be chlorinated and consolidated to form a dense, water-free glass layer on starting member 12 prior to applying a second coating of soot thereto. In accordance with this latter embodiment, after the first soot coating is chlorinated and consolidated, the surface thereof may be polished and cleaned to remove surface irregularities prior to the application of the second soot coating. A particularly suitable method for smoothing the outside surface of the consolidated first coating includes mechanically polishing and thereafter flame polishing the surface. Hydrofluoric acid washing of the surfaces should be performed before and after all polishing operations to avoid contamination.

Starting member 12 may be removed by grinding, drilling, acid etching or the like. This step is discussed in greater detail in the aforementioned U.S. Pat. No. 3,737,292, which also discusses drawing the resultant composite structure into an optical waveguide.

The invention will be further described with reference to specific embodiments thereof which are set forth in the following examples. In Examples 2–5, which pertain to the manufacture of optical waveguides, the inside diameter of the furnace muffle was 2.75 inches and the length thereof was 18 inches. The consolidation gas mixture was supplied to the muffle at the rate of 30 cubic feet per hour in these examples.

EXAMPLE 1

A tubular starting member of fused quartz, approximately 0.2 inch in diameter and about 10 inches long was secured to a handle. Dry oxygen was bubbled through liquid $SiCl_4$ which had been heated to 35°C., and vapors of that liquid were picked up by the oxygen. This oxygen along with the vapor entrained therewith was then passed through a gas-oxygen flame where the vapors hydrolyzed to form a steady stream of approximately 0.1 $\mu$m sphere like particles of $SiO_2$. The stream of particles was directed to the starting member, and a soot coating of these particles was applied up to about 2.0 inches in diameter.

A gas mixture containing 90 vol. percent helium and 10 vol. percent chlorine was admitted to a consolidation furnace at a flow rate of 30 cubic feet per hour. The preform of silica soot was placed in the furnace at position A of FIG. 4, which was about 5 inches above the peak temperature region of a 3 inch ID alumina muffle that was disposed in the furnace. The temperature profile within the muffle is indicated in FIG. 4, the peak temperature being about 1500°C. After remaining in position A for 15 minutes, the preform was lowered at a rate of 15 inches per minute until the end of the preform was 1 inch above the 1500°C. peak temperature region as illustrated by position B. The preform was maintained in this position for about 10 minutes to insure consolidation of the end portion thereof. The preform was then lowered at about 50 inches per hour through the 1500°C. zone until it reached position D where it was held for 5 minutes to completely consolidate the preform. The resultant consolidated dense glass body was then withdrawn to position A at a rate of 50 inches per minute and was then removed from the furnace. The consolidated vitreous silica contained less than 1 part per million OH.

EXAMPLE 2

A starting member as described in Example 1 was used to form an optical waveguide blank. Liquid $SiCl_4$ and liquid $GeCl_4$ were maintained at 32°C. in first and second containers, respectively. Dry oxygen was bubbled through the first container at 2300 cc per minute and through the second container at 500 cc per minute. The resultant vapors entrained within the oxygen were combined and passed through a gas-oxygen flame where the vapor was hydrolyzed to form a steady stream of particles having a composition of 10% by weight $GeO_2$ and 90% by weight $SiO_2$. The stream was directed to the starting member and a soot coating of these particles was applied up to about 1.1 inch in diameter. A second coating of 100% $SiO_2$ was then applied over the first soot coating by terminating the flow of oxygen to the liquid $GeCl_4$, thereby causing the introduction of only $SiCl_4$ vapor to the flame. The $SiO_2$ soot was applied until an outside diameter of approximately 1.75 inches was obtained.

Figure 5:
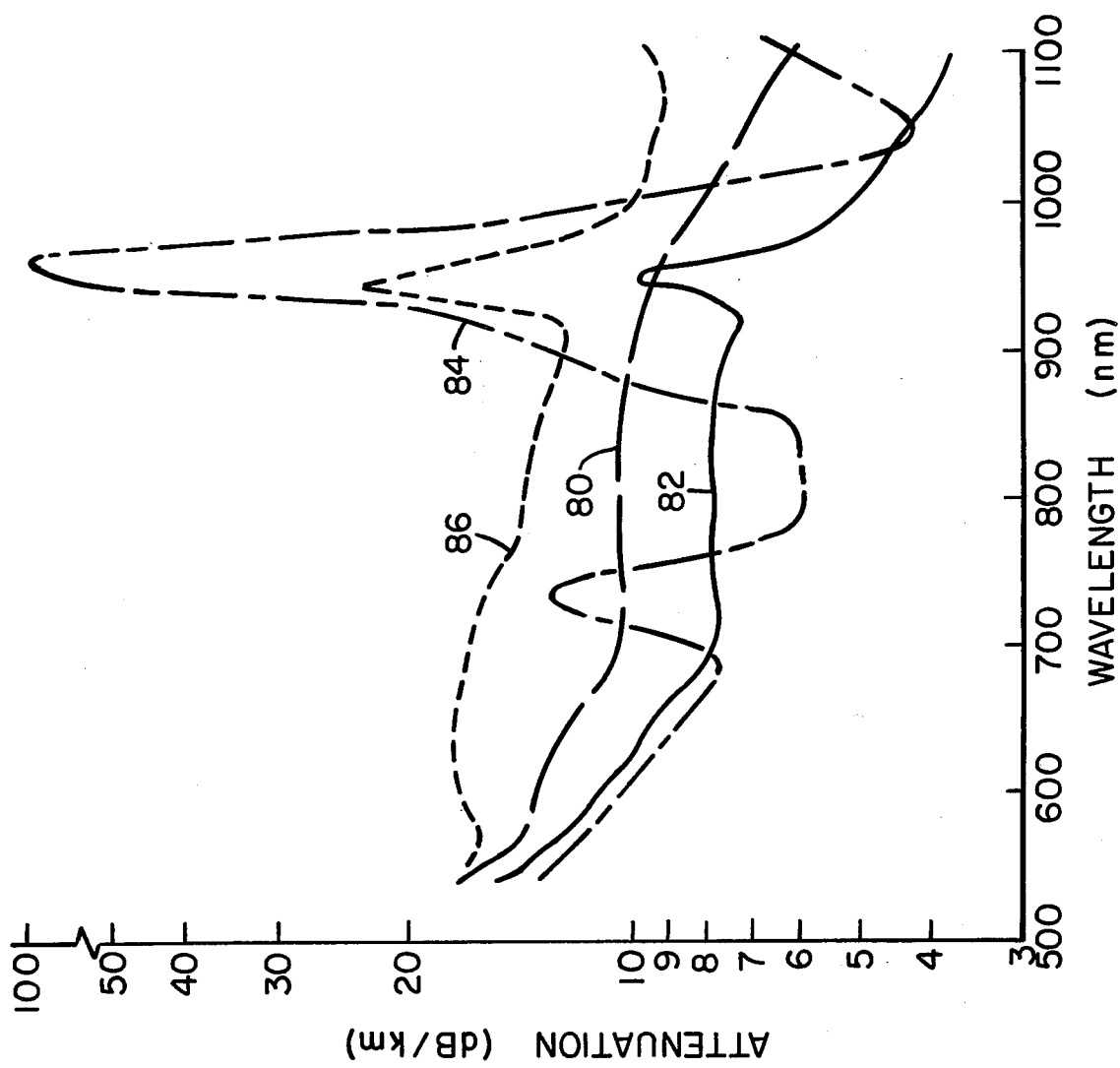
FIG. 5 is a graph of attenuation curves for a plurality of optical waveguides.

Chlorine gas was purified by means of an apparatus such as that illustrated in FIG. 3 wherein it was passed through deionized water and a condenser coil which was maintained at a temperature of about 0°C. A gas mixture containing 3 vol. percent chlorine, 0.5 vol. percent oxygen and 96.5 vol. percent helium, was flowed into the consolidation furnace. The soot preform was processed in the furnace in the manner described in Example 1. Hydrofluoric acid was pumped through the tubular quartz starting member until it was completely removed. The resultant structure was drawn at a temperature of about 2000°C. to collapse the central hole and decrease the outside diameter thereof. Drawing was continued until the final waveguide diameter of 125 $\mu$m was achieved, the core diameter being about 84 $\mu$m. This waveguide was found to contain less than 1 ppm OH. As indicated by curve 80 of FIG. 5, the attenuation of this waveguide was less than 15 dB/km for wavelengths greater than 600 nm and no peak occurred at 950 nm.

EXAMPLE 3

An optical waveguide preform was formed in accordance with Example 2. The chlorine gas was purified as described in Example 2, and its content in the consolidating gas mixture was reduced to 1 vol. percent, the remainder being 0.5 vol. percent oxygen and 98.5 vol. percent helium. The preform was consolidated and drawn into an optical waveguide in the manner described in Example 2. As indicated by curve 82 of FIG. 5, the attenuation of this waveguide was less than 10 dB/km at wavelengths greater than 650 nm. It is noted that a small peak occurs in curve 82 at about 950 nm. It was determined that this waveguide contained about 3 ppm OH and a $\beta_{OH}$ value of about 0.003.

EXAMPLE 4

To illustrate the advantage of employing chlorine during the consolidation process two identical preforms were prepared. One of these preforms was processed in an atmosphere containing 1 vol. percent chlorine, 0.5 vol. percent oxygen and 98.5 vol. percent helium as described in Example 3. The attenuation of the resultant optical waveguide was less than 10 dB/km between 700 and 1100 nm, the attenuation curve being similar to curve 82 of FIG. 5. The second of the two identical blanks was processed for 30 minutes in position A of the furnace (see FIG. 4) in a gas mixture containing 96.5 vol. percent helium, 3 vol. percent chlorine and 0.5 vol. percent oxygen. This preform was then processed through the remainder of the cycle described in Example 1 in 100% helium. Curve 84 of FIG. 5 clearly illustrates the increase in attenuation due to the water content of the optical waveguide formed from the preform which was chlorine treated in the presoak only. The attenuation at 950 nm was about 100 dB/km. To summarize this comparison, the waveguide, which was drawn from a preform which was presoaked in an atmosphere containing 3 vol. percent chlorine and then consolidated in an atmosphere containing 100% helium, exhibited an attenuation of 100 dB/km at 950 nm whereas a waveguide drawn from a preform, which was both presoaked and consolidated in an atmosphere containing 1 vol. percent chlorine, exhibited an attenuation of only about 10 dB/km at that wavelength.

EXAMPLE 5

An optical waveguide preform was formed in accordance with Example 2. The consolidation atmosphere was obtained by bubbling 0.5 vol. percent oxygen through $SiCl_4$ at 35°C. and mixing the resulting oxygen-vapor mixture with 99.5 vol. percent helium. After the preform was consolidated in this atmosphere in accordance with the steps set forth in Example 1, it was formed into an optical waveguide in the manner described in Example 2. As shown by curve 86 of FIG. 5, the attenuation of this waveguide was less than 18 dB/km between 600 and 1100 nm except around 950 nm where it was about 23 dB/km. It is noted that the attenuation curve for this waveguide is slightly higher than curves 80 and 82 due to the presence of impurities therein. However, the peak at 950 nm is only about 10 dB/km greater than the background portion of curve 86, indicating that about 8 ppm OH is present in this waveguide.

I claim:

1. In the method of forming a glass article comprising the steps of
depositing on a starting member a coating of flame hydrolysis-produced glass soot to form a soot preform,
consolidating said soot preform to form a dense glass layer free from particle boundaries, and
forming said dense glass layer into a desired shape, said consolidation step being characterized in that it comprises
heating said soot preform to a temperature within the consolidation temperature range for a time sufficient to cause said soot particles to fuse and form a dense glass layer, and simultaneously
subjecting said soot preform to a stream of a substantially dry, hydrogen-free, chlorine containing atmosphere that is substantially free from contaminants that would adversely affect the optical properties of said glass article, said chlorine permeating the interstices of said soot preform during the consolidation thereof and replacing hydroxyl ions by chlorine ions, thereby resulting in a glass article that is substantially water-free.

2. A method in accordance with claim 1 wherein the step of heating comprises initially subjecting one end of said preform to a temperature that is higher than that to which the remainder of said preform is subjected so that said one end consolidates first, and consolidation continues to progress from said one end toward the remaining end of said preform.

3. A method in accordance with claim 1 wherein the step of heating comprises gradually inserting said preform into a furnace at such a rate that the part thereof that is initially inserted consolidates first and consolidation continues to progress gradually until said entire soot preform is consolidated.

4. A method in accordance with claim 3 wherein, after the initial portion of said preform begins to consolidate, said preform is inserted into said furnace at a rate of 0.1 to 1.0 inch per minute.

5. A method in accordance with claim 4 wherein, after said preform is completely consolidated, it is withdrawn from said furnace at a rate of 0.1 to 1.0 inch per minute.

6. A method in accordance with claim 1 wherein said chlorine containing atmosphere comprises up to 5 volume percent chlorine, the remainder of said atmosphere primarily consisting of helium.

7. A method in accordance with claim 1 further comprising the step of removing said starting member prior to the step of forming said member to a desired shape.

8. A method in accordance with claim 1 wherein said soot has a high silica content and the step of heating comprises subjecting said soot preform to a maximum temperature in the range of 1200°–1700°C.

9. A method in accordance with claim 1 further comprising the steps of depositing on said soot preform a second coating of flame hydrolysis-produced glass soot having an index of refraction less than that of the glass of said soot preform prior to the step of consolidating said soot preform.

10. A method in accordance with claim 9 wherein said soot preform is formed of doped fused silica and said second coating is formed of fused silica doped to a lesser degree than that of soot preform.

11. The method of claim 10 further comprising the step of removing said starting member, and wherein the step of forming comprises
heating the structure so formed to the drawing temperature of the materials thereof, and
drawing the heated structure to reduce the cross-sectional area thereof and to collapse the hole resulting from removing said starting member and to form a clad fiber having a solid cross-section.

12. A method in accordance with claim 1 further comprising the steps of
depositing on the surface of said dense glass layer a second coating of flame hydrolysis-produced glass soot,
heating said second coating of soot to a temperature within the consolidation temperature range for a time sufficient to cause said soot particles to fuse and form a second dense glass layer, and simultaneously
subjecting said second coating of soot to a stream of a substantially dry chlorine containing atmosphere.

13. A method in accordance with claim 12 further comprising the step of removing said starting member, and wherein the step of forming comprises
heating the structure so formed to the drawing temperature of the material thereof, and
drawing the heated structure to reduce the cross-sectional area thereof and to collapse the hole resulting from removing said starting member and to form a clad fiber having a solid cross-section.

14. In the method of forming a glass optical waveguide fiber comprising the steps of
depositing on a cylindrically shaped starting member a coating of flame hydrolysis-produced glass soot to form a soot preform,
consolidating said soot preform to form a dense glass layer free from particle boundaries,
heating the structure so formed to the drawing temperature of the materials thereof, and
drawing the heated structure to reduce the cross-sectional area thereof, thereby forming an optical waveguide fiber having a solid cross-section,
said consolidation step being characterized in that it comprises
heating said soot preform to a temperature within the consolidation temperature range for a time sufficient to cause said soot particles to fuse and form a dense glass layer, and simultaneously
subjecting said soot preform to a stream of a substantially dry, hydrogen-free chlorine containing atmosphere that is substantially free from contaminants that would increase the light absorption of said waveguide fiber, said chlorine permeating the interstices of said soot preform during the consolidation thereof and replacing hydroxyl ions by chlorine ions, thereby resulting in a glass waveguide fiber that is substantially water-free.

15. A method in accordance with claim 14 wherein the step of heating comprises initially subjecting one end of said preform to a temperature that is higher than that to which the remainder of said preform is subjected so that said one end consolidates first, and consolidation continues to progress from said one end toward the remaining end of said preform.

16. A method in accordance with claim 15 wherein said chlorine containing atmosphere comprises up to 5 volume percent chlorine, the remainder of said atmosphere primarily consisting of helium.

17. A method in accordance with claim 16 further comprising the step of removing said starting member prior to the step of drawing.

18. A method in accordance with claim 17 further comprising the steps of depositing on the surface of said dense glass layer a second coating of flame hydrolysis-produced glass soot, heating said second coating of soot to a temperature within the consolidation temperature range for a time sufficient to cause said soot particles to fuse and form a second dense glass layer, and simultaneously subjecting said second coating of soot to a stream of a substantially dry chlorine containing atmosphere that is substantially free from contaminants that would increase the light absorption of said waveguide fiber, said chlorine permeating the interstices of said second layer of soot during the consolidation thereof and replacing hydroxyl ions by chlorine ions, thereby resulting in a glass waveguide fiber that is substantially water-free.

* * * * *